Figure 1:
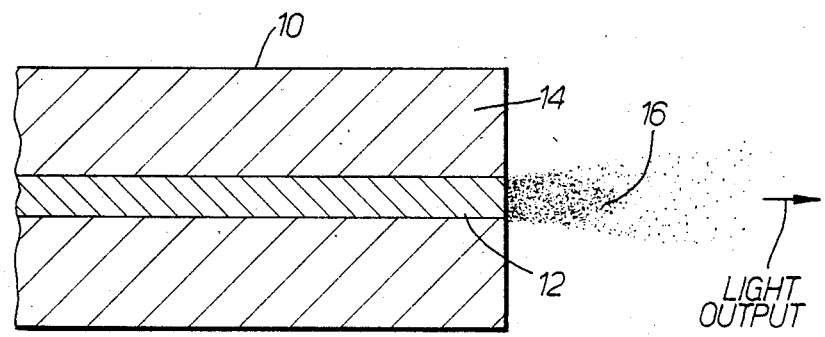

United States Patent [19]

Stewart

[11] Patent Number: 4,586,816
[45] Date of Patent: May 6, 1986

[54] OPTICAL FIBRE SPOT SIZE DETERMINATION APPARATUS

[75] Inventor: William J. Stewart, Blakesley, England

[73] Assignee: Plessey Overseas Limited, Ilford, England

[21] Appl. No.: 564,826

[22] Filed: Dec. 23, 1983

[30] Foreign Application Priority Data

Dec. 24, 1982 [GB] United Kingdom ............... 8236784

[51] Int. Cl.⁴ .......................................... G01N 21/84
[52] U.S. Cl. .................................................. 356/73.1
[58] Field of Search ..................... 356/73.1; 350/274

[56] References Cited

U.S. PATENT DOCUMENTS 3,379,891 4/1968 Aroyan ......................... 350/274 X
3,612,885 10/1971 Arnaud .

FOREIGN PATENT DOCUMENTS 0077259 4/1983 European Pat. Off. .
940735 10/1963 United Kingdom .
1242574 8/1971 United Kingdom .
1352832 5/1974 United Kingdom .

OTHER PUBLICATIONS

Streckert, "New Method for Measuring the Spot Size of Single-Mode Fibers" Optics Letters, vol. 5, #12, Dec. 1980, pp. 505-506.
IEEE Journal of Quantum Electronics, vol. QE18, No. 10, pp. 1451-1466, W. J. Stewart, "Optical Fiber & Preform Profiling Technology" published Oct. 1982.

Primary Examiner—Vincent P. McGraw
Attorney, Agent, or Firm—Fleit, Jacobson, Cohn & Price

[57] ABSTRACT

Apparatus for measuring the spot size of light emerging from an optical fibre comprises a rotating radial grating which is moved relative to a monochromatic beam of light, passing through the fibre, to vary the spatial frequency of the light entering a photodetector situated at the output end of the optical fibre, thereby obtaining a variation in the modulation amplitude of the light received by the detector, allowing measurement of the spot size to be obtained.

7 Claims, 9 Drawing Figures

OPTICAL FIBRE SPOT SIZE DETERMINATION APPARATUS

The present invention relates to optical fibre apparatus and more particularly to an apparatus for measuring the spot size of a light guiding fibre.

Optical fibres of the light guiding type have a core region surrounded by a cladding. This invention concerns the measurement of the spot size of light emerging from the core region of such a fibre. By spot size it is meant the diameter of the light emerging from the core region at the end of the fibre measured, for example, to the $1/e^{178}$ intensity points. Although the index step at the core region may be well defined the patch of light emerging from the fibre will almost certainly diffuse and spread out.

It is an object of the present invention to measure the spot size of light emerging from an optical fibre.

According to the present invention there is provided apparatus for measuring the spot size of light emerging from an optical fibre of the light guiding type, including means for imaging a beam of light into one end of a fibre to be examined, light detection means situated at the other end of the fibre, means to modulate the beam of light entering the detection means, means connected to the output of said detection means for measuring the amplitude of said modulated beam of light and including means for varying the spatial frequency of the modulated beam of light to change the amplitude of said modulated beam of light to enable the spot size of light emerging from the fibre to be derived.

Figure 2:
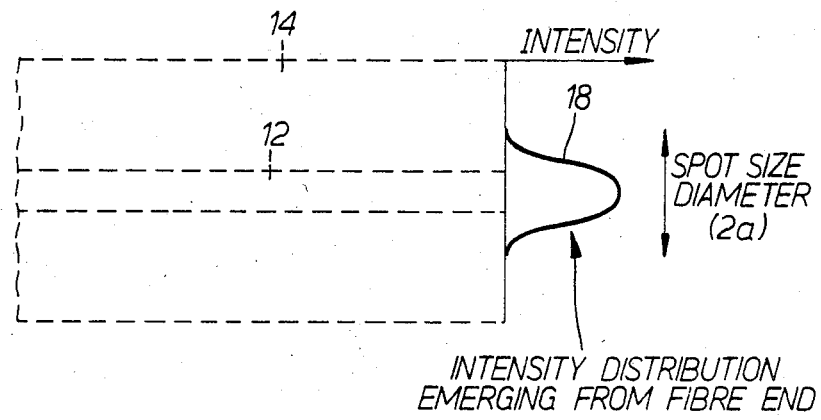
Figure 3:
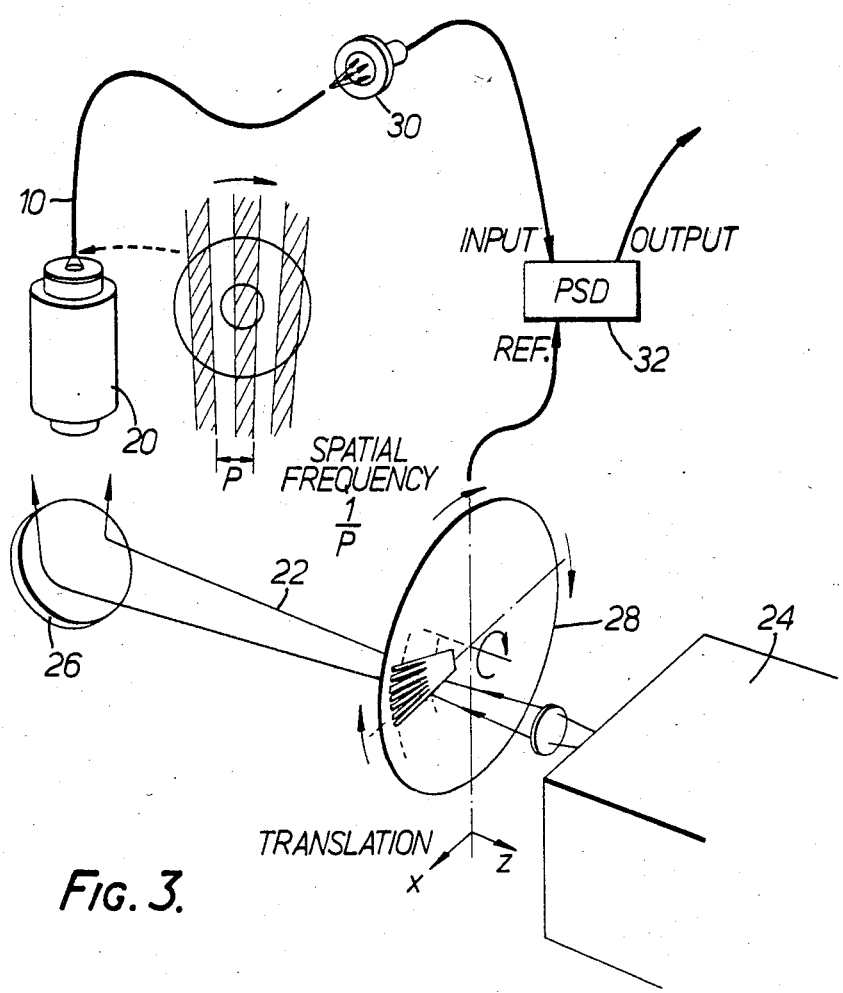

Embodiments of the present invention will now be described with reference to the accompanying drawings in which:

FIG. 1 shows an optical fibre of the light guiding type illustrating the dispersion of output light FIG. 2 shows the fibre of FIG. 1 illustrating the intensity distribution of light emerging from the fibre end, FIG. 3 shows a first apparatus for measuring the spot size according to the present invention.

Figure 4:
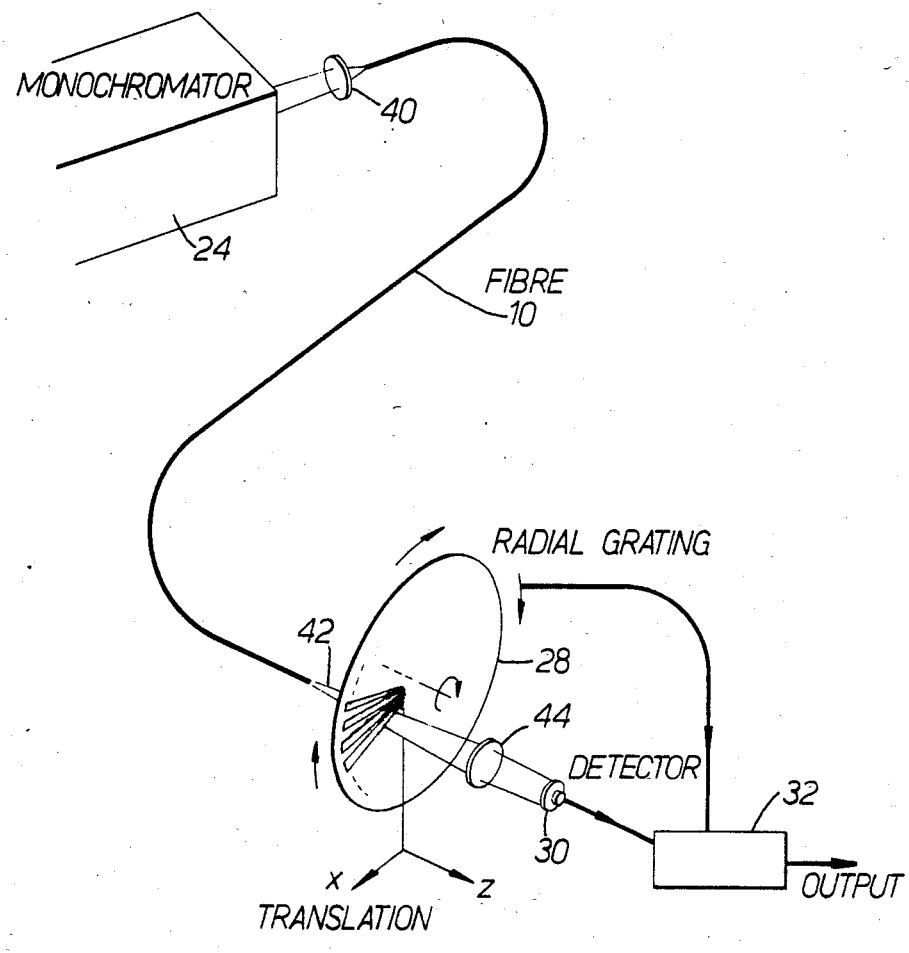
Figure 5:
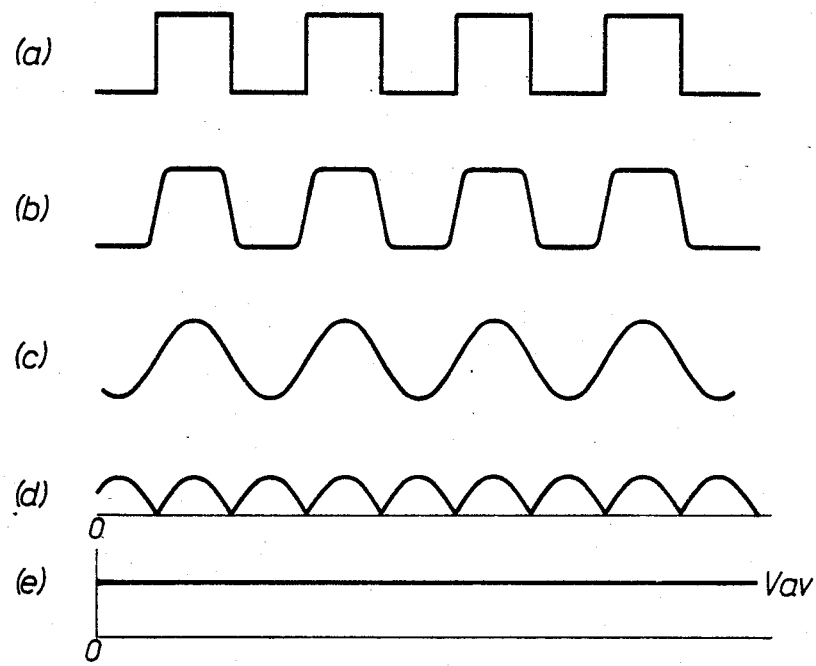
Figure 6:
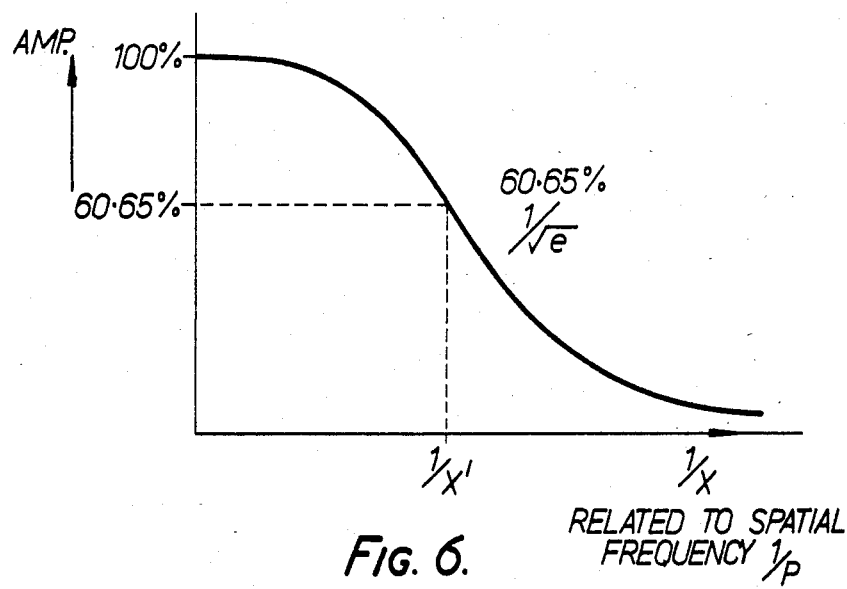
Figure 7:
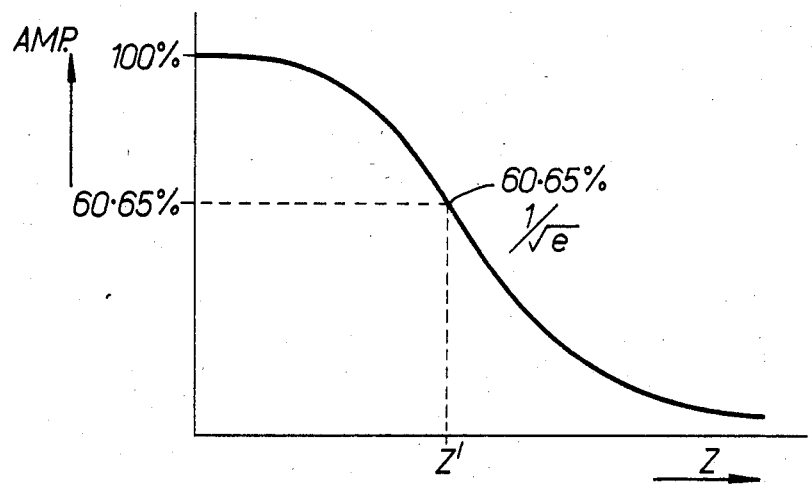
Figure 8:
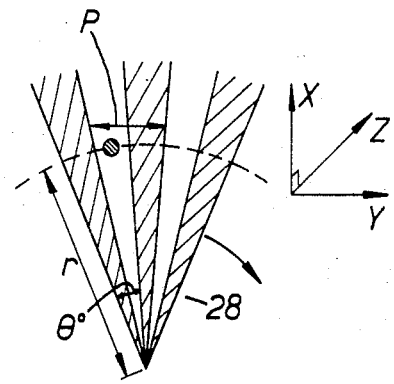
Figure 9:
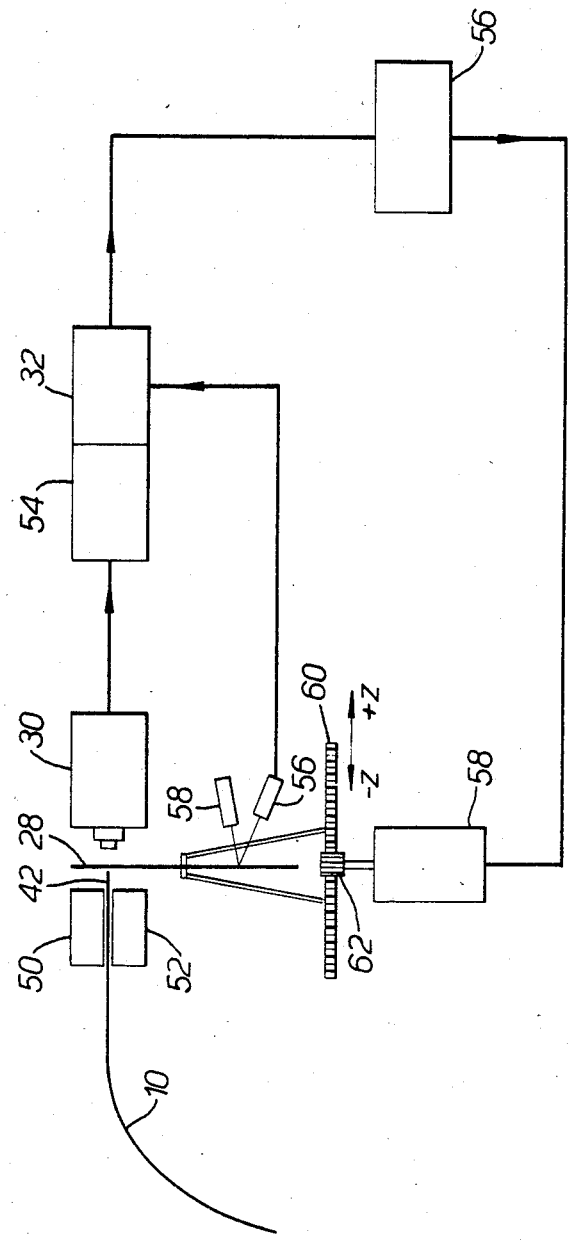

FIG. 4 shows a second apparatus for measuring the spot size according to the present invention, FIG. 5 shows waveforms illustrating the calculation of spot size, FIG. 6 shows a graph of the amplitude of the modulated transmitted intensity from the phase sensitive detector of FIG. 3 against the inverse of the lateral translation distance of the radial grating of FIG. 3 illustrating the calculation of the spot size, FIG. 7 shows the graph of FIG. 6 for movement of the grating in the Z direction, FIG. 8 shows in greater detail part of the radial grating of FIG. 3 and FIG. 9 shows diagramatically circuitry for the calculation of spot size according to the present invention.

Referring now to FIG. 1 of the drawings an optical fibre of the light guiding type 10 comprises a core 12 and cladding 14 surrounding the core. Light 16 is output from the core of the fibre as shown and the intensity of the light 18 is shown in FIG. 2. The diameter of the intensity of the light to the $1/e^{178}$ point is $2a$.

Referring now to FIG. 3 the apparatus comprises a fibre 10 under test positioned to receive the light output from an oil immersion objective lens 20. A beam of light 22 generated by a monochromator 24 is directed onto the objective by a mirror 26. The beam 22 is modulated by a rotating radial grating 28 which is able to be laterally translated by movement on the direction of the arrow X by suitable mechanical means as described hereinafter with reference to FIG. 9.

The other end of fibre 10 is positioned such that the output light is detected by a photodetector 30 the output of which is fed to a first input of a phase sensitive detector 32. The phase sensitive detector 32 has a reference input provided by the rotation of the radial grating 28 and the output of the phase sensitive detector can be used as described in greater detail hereinafter to determine the spot size.

With reference now to FIG. 4, an alternatively configured apparatus is shown, parts of the apparatus performing similar functions to FIG. 3 being given the same reference numerals. Monochromatic light (which can be infra red) is provided by a monochromator 24 and is focussed by a simple lens arrangement 40 onto a fibre 10. The output beam 42 is arranged to illuminate the radial grating 28 which, as in FIG. 3 is rotating in the direction shown. The speed of rotation of the grating 28 is not critical but is governed by two functions. Firstly the speed must be sensibly low to avoid any mechanical problems of mounting the radial grating, which is normally for practical purposes a glass plate with the appropriate pattern printed on it. Secondly the speed of rotation is chosen such that the periodicity of the output waveform is within the acceptable frequency range of the phase sensitive detector 32 to which the signal formed by the chopped light beam is passed via focussing lens 44 and detector 30.

The advantage of the arrangement of the apparatus of FIG. 4 over that of FIG. 3 is that the optical focussing system is slightly less complex. In particular the oil immersion objective lens 20 is eliminated by using the system of FIG. 4.

In the arrangement in FIG. 4 the preferred direction of movement of the grating is in the Z direction, to be described hereinafter.

Referring now to FIG. 5 the radial grating 28 represents a square wave as shown in waveform (a). However the actual light output from the grating is distorted as shown in waveform (b). The required output to calculated spot size is a sinusoidal waveform as shown in waveform (c) and thus can be produced by passing waveform (b) through an appropriate low pass filter (see FIG. 9). The phase sensitive detector 32 converts this waveform (c) into a full wave rectified form as shown in (d) which can be averaged in for example a digital voltmeter (see FIG. 9).

With reference now to FIG. 6, a graph is shown of the amplitude of the modulated transmitted intensity from the phase sensitive detector 32 versus the inverse of movement of the radial grating in the X direction. The curve so formed is called a modulation transfer function. With reference also to FIG. 8, it may be seen that as the radial grating 28 is moved in the X direction the spatial frequency, which is equal to the inverse of the measurement P, is increased:

$P/r = \tan \theta$ $P = r \tan \theta$ spatial frequency $= 1/P = 1/r \tan \theta$ spot size $(a) \propto 1/X'$ where $1/X' = 1/e^{\frac{1}{2}}$ which is the point at which the modulation transfer function intensity for the particular wavelength of light reaches the $1/e^{\frac{1}{2}}$ level (=60.65% of the original level).

With reference now to FIG. 7, in the embodiment of FIG. 4 the grating is moved in the Z direction. Although the distance P does not vary, the diameter of the spot will increase as the grating 28 is moved away from the end 42 of the fibre 10. Thus the effect is to change the spatial frequency in a similar but inverse manner as the movement in the X direction.

The relationship in this case is that the Period P is proportional to the inverse of the distance in the Z direction Thus $P \propto 1/Z$ and spatial frequency $\propto$ spot size $\propto Z$ As for FIG. 6, the $1/e^{\frac{1}{2}}$ point is calculated from the original level of output of the PSD and the distance $Z'$ is therefore a measure of the spot size.

The process of obtaining the measurement $Z^1$ in a practical embodiment will now be described with reference to FIG. 9, in which parts of the apparatus performing similar functions to those in FIG. 4 are given the same reference numerals.

Although the following description of operation is given for the embodiment of FIG. 4, it may be seen that a similar operation can be used to give results for the embodiment of FIG. 3 by a translation movement in the X direction rather than the Z direction as now described.

In FIG. 9 the fibre 10 is held by clamping between two blocks 50, 52 in for example a "V" groove for acurate alignment. The end 42 of the fibre is initially positioned as close as possible to the face of the radial grating 28. Light chopped by the grating 28 enters the detector 30. The output of detector 30 is fed via a low pass filter 54 to the phase sensitive detector 32.

The phase sensitive detector 32 is set up to a standard output level by comparing the output frequency of the low pass filter 54 with a reference waveform provided by a reference detector 56 which produces an output by receiving light reflected from the reflective fingers of grating 28, the grating being illuminated from a source 58. The phase sensitive detector is set up for each reading by equalising the phase of the input and reference waveforms. This can be done automatically with commercially available detectors.

The output of the detector 32 is fed to a digital voltmeter 56 capable of providing an output signal during a period whilst voltage level on said meter is between preset levels. The first level is set at 100% to equal the first output level from the detector 32 obtained when the fibre is closest to the grating and the second level is set at 60.65% to equal the $1/e^{\frac{1}{2}}$ level.

The output of the digital voltmeter 56 is fed to a stepper motor 58, the output of which drives a rack 60 via a pinion wheel 62, which provides adjustment of the position of the radial grating in the Z direction relative to the end of the fibre 42. The distance between the fibre end 42 and the detector 30 is fixed.

In operation, the radial grating 28 is initially moved as close as possible to the fibre end 42 to achieve a maximum light output through the grating. The phase sensitive detector 32 gives an output which is normalised to equal 100% on the output of the voltmeter 56.

The grating 28 is then moved in the +Z direction, away from the end of the fibre. The modulation amplitude of the light input onto the detector 30 will decrease as the grating is moved in the direction +Z, giving a reduction in voltage received at the digital voltmeter 56. This can be used to automatically move the grating via stepper motor 58 until the reading on the voltmeter drops to 60.65% of its original value, providing that the phase sensitive detector 32 is of the automatic adjusting type. The operation can alternatively be done manually by moving the grating a discrete number of steps of the motor in the Z direction and recording the voltage reading at each sample point following normalisation of the phase detector.

Either by the automatic system or by manual adjustment a series of voltage readings can be taken if desired to produce the graphs shown in FIGS. 6 and 7.

The distance $Z'$ covered by the grating 28 for the fall in output voltage from the 100% level to the 60.65% level can be used to calculate the spot size using the equation $a = \lambda Z'/P$.

This distance can be measured directly by a linear scale on the rack 60 or indirectly by a conversion from the number of steps taken by the stepper motor 58. Similarly, for translation of the grating in the X direction the spot size can be calculated from the number of steps taken by the stepper motor in reducing the voltage output from the 100% to the 60.65% ($1/e^{\frac{1}{2}}$) level using the equation $\lambda Z/X' \tan \theta$.

As an alternative to modulation of the light by the radial grating, a rotating cylindrical drum with opaque and transparent bars in the cylindrical surface may be used. The fibre may be positioned to illuminate the cylindrical surface the detector being positioned on the opposite side. Variation of modulation can be obtained by moving the drum.

I claim:

1. Apparatus for measuring the spot size of light emerging from an optical fibre of the light guiding type comprising: means for imaging a beam of light onto one end of a fibre to be examined, light detection means situated at the other end of the fibre, means to modulate the beam of light entering the detection means substantially independently of said optical fibre, means connected to the output of said detection means for measuring the amplitude of said modulated beam of light, and means for varying the spatial frequency of the modulated beam of light substantially independently of said optical fibre to change the amplitude of said modulated beam of light to enable the size of a spot of light emerging from the fibre to be derived.

2. Apparatus for measuring the spot size of light as claimed in claim 1 in which the means for varying the spatial frequency of the modulated beam of light includes a radial grating.

3. Apparatus for measuring the spot size of light as claimed in claim 2 in which the radial grating is situated at the input end of the fibre to modulate the light entering the fibre.

4. Apparatus for measuring the spot size of light as claimed in claim 2 in which the radial grating is situated at the output end of the fibre to modulate the light output from the fibre.

5. Apparatus for measuring the spot size of light as claimed in claim 2 in which the detection means includes a phase sensitive detector and a photodetector, the photodetector being positioned to receive the modulated light output from the fibre and the phase sensitive detector being connected to the output of the photodetector and including means for measuring the output of the phase sensitive detector to determine a predetermined decrease in output, said predetermined decrease in output being produced by the variation of spatial frequency of the modulated beam of light.

6. Apparatus for measuring the spot size of light as claimed in claim 5, in which the spatial frequency of the modulated light is varied by moving the radial grating orthogonally with respect to the end of the fibre.

7. Apparatus for measuring the spot size of light as claimed in claim 5 in which the spatial frequency of the modulated light is varied by moving the radial grating longitudinally with respect to the end of the fibre.

* * * * *